Sept. 17, 1963 F. C. HAUGLAND 3,103,939
APPARATUS FOR IMMERSING AND DRAINING PIPE LENGTHS
Filed Sept. 7, 1962 5 Sheets-Sheet 1

INVENTOR
FRANK C. HAUGLAND
By Donald G. Dalton
Attorney

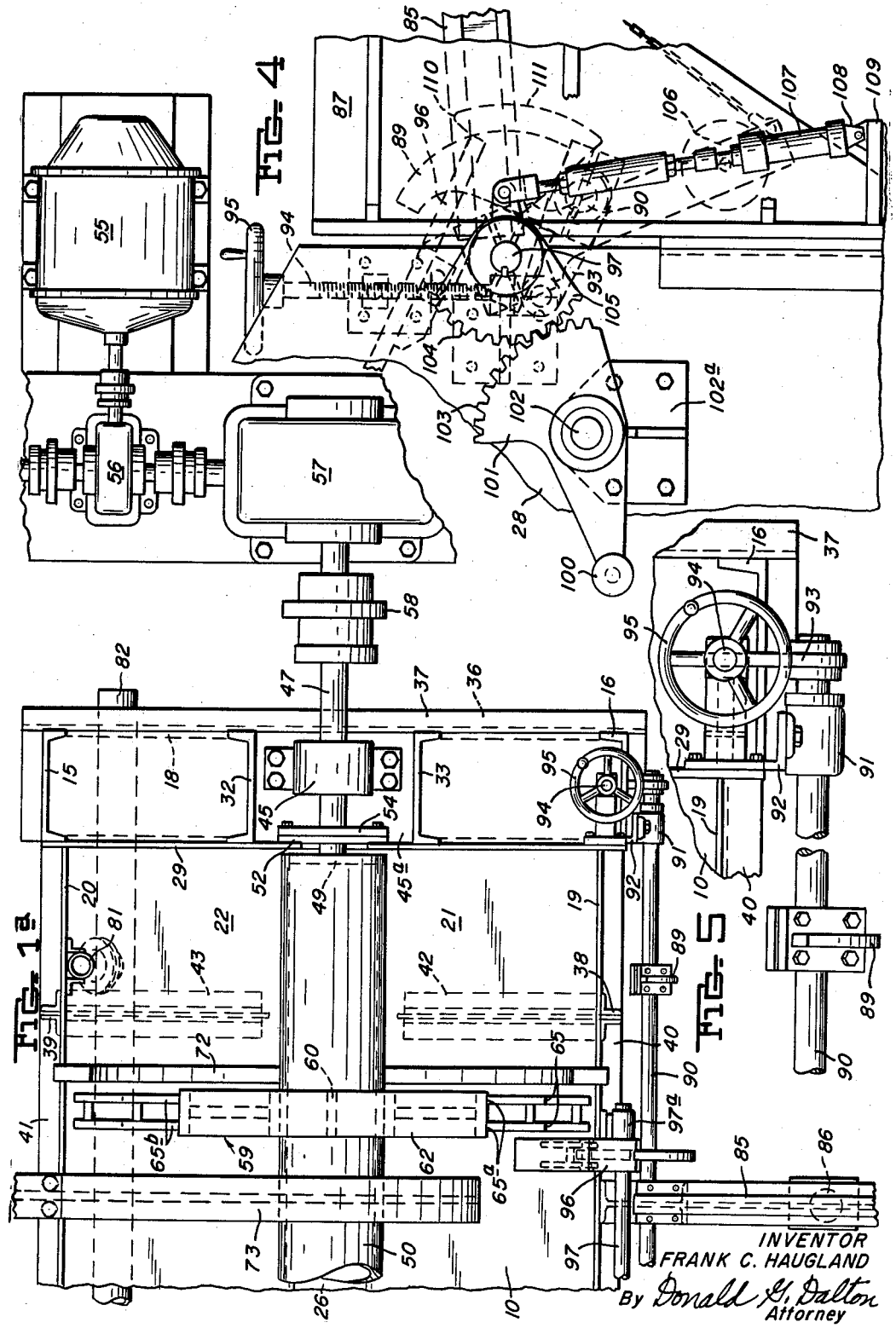

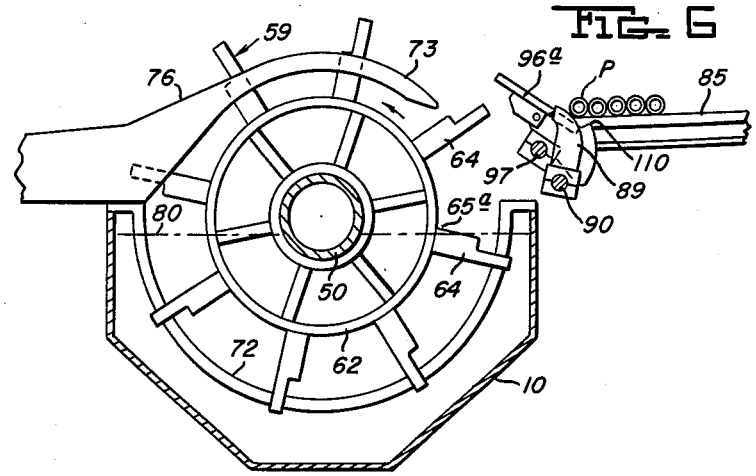
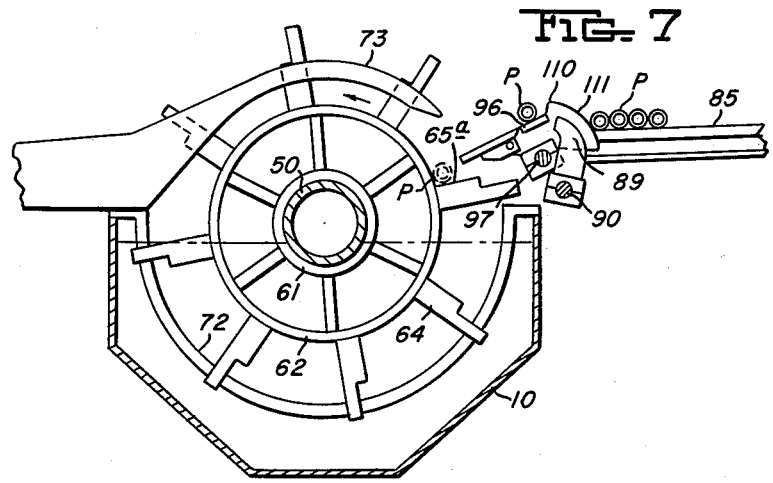
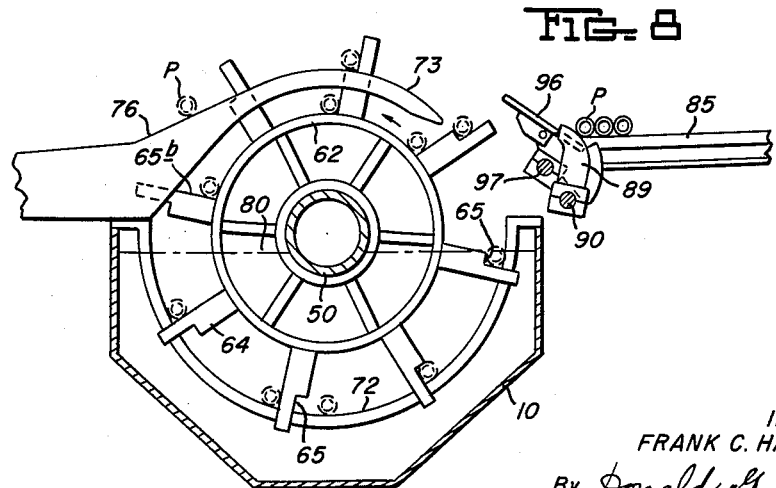

United States Patent Office 3,103,939
Patented Sept. 17, 1963

3,103,939
APPARATUS FOR IMMERSING AND DRAINING PIPE LENGTHS
Frank C. Haugland, Avon Lake, Ohio, assignor to United States Steel Corporation, a corporation of New Jersey
Filed Sept. 7, 1962, Ser. No. 221,964
3 Claims. (Cl. 134—134)

This invention relates to apparatus for immersing pipe lengths in a tank of liquid and draining them on removal. More particularly, it relates to apparatus for conveying pipe lengths and the like, to be washed, rinsed or otherwise treated, laterally through a treating tank containing the necessary treating liquid and thereafter permitting liquid to drain from the pipe length on removal from the tank.

In the manufacture of pipe, it is desirable to immerse the lengths thereof in a tank of liquid for some operation thereon. If the lengths are immediately transferred to a second tank without sufficient drainage time, the first tank will be depleted of its treating liquid, whereas a subsequent tank containing a different liquid will be contaminated.

An object of the present invention is to provide means for automatically and sequentially handling pipe lengths through receiving and feeding means, passing them through a treating tank, while providing sufficient time for drainage after treatment and thereafter discharging them to transfer means.

A more specific object is to provide apparatus for immersing or dipping pipe lengths comprising a tank, a rotatable shaft thereon having spaced arms with notched ends adapted to sweep pipe through the tank and to receive and to hold pipe in their notched ends, means for feeding pipe inwardly of the notched ends and discharge means on the other side of the tank to receive pipe from the notched ends.

In accomplishing these and other objects of the invention, I have provided a novel handling apparatus, a preferred form of which is shown in the accompanying drawings, in which:

FIGURES 1 and 1a together are a plan view of a portion of a pipe-treating tank and apparatus for handling pipe into and out of the tank, with parts omitted for clearness;

FIGURE 4 is an enlarged view in end elevation of a portion of a pipe-feed means;

FIGURE 5 is a plan view of a portion of FIGURE 4 showing details of an adjustable pipe stop;

FIGURES 6, 7, 8 are somewhat schematic end elevation views of the apparatus showing a sequential handling of pipe lengths by charging, immersing and discharging means.

Figure 1:
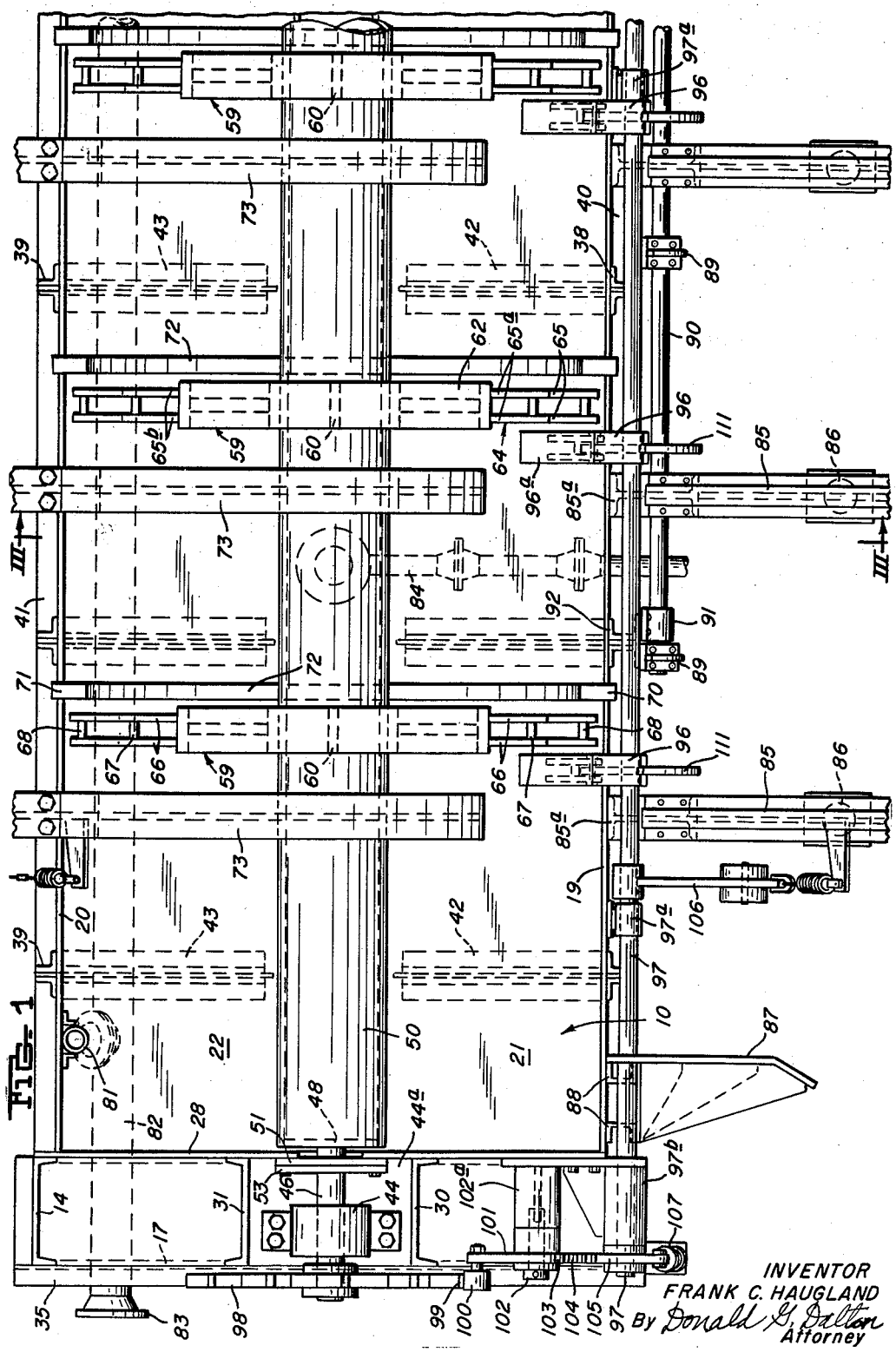
Figure 2:
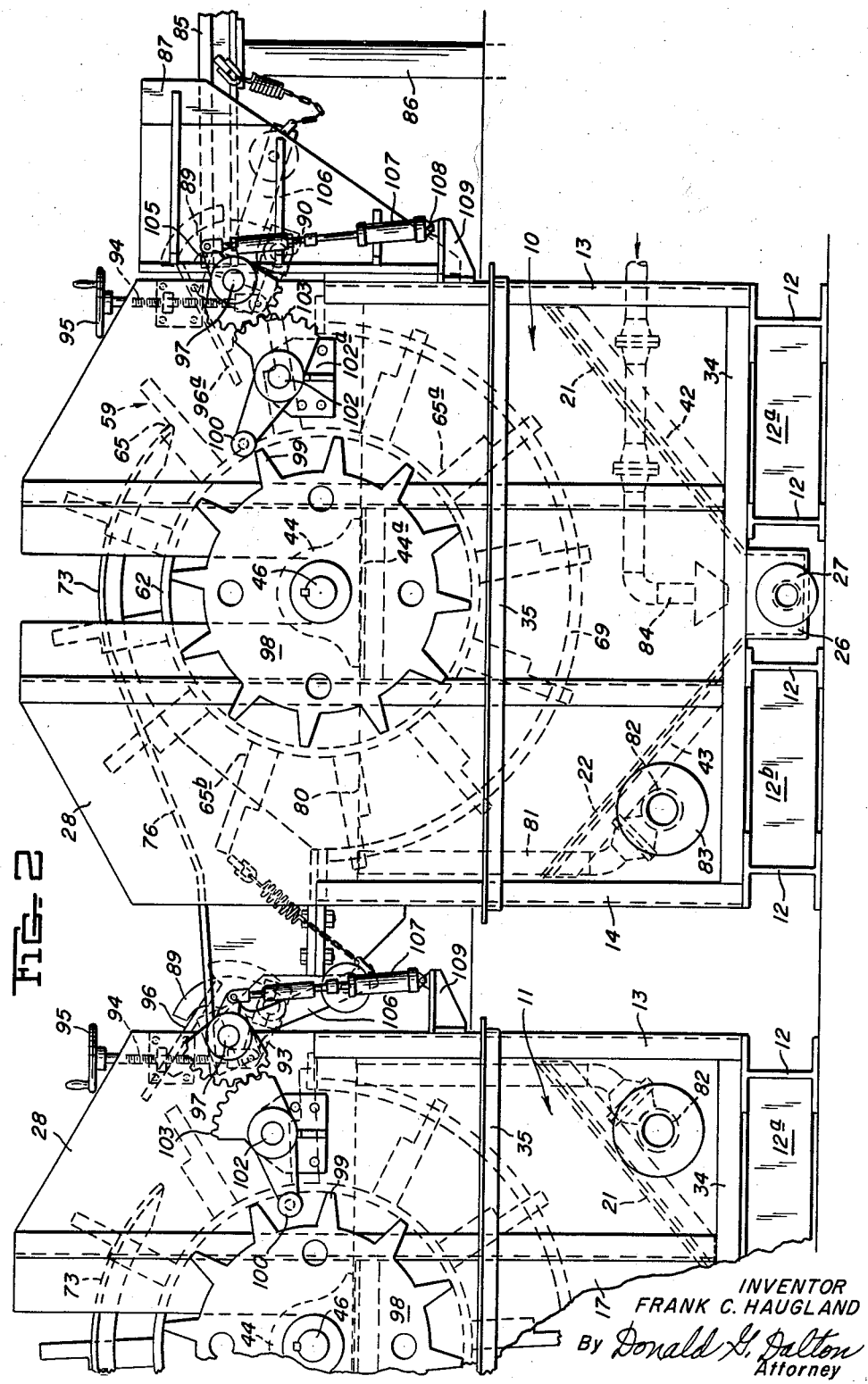
FIGURE 2 is an end elevation of an arrangement of two similar tanks in series, showing details of means for feeding pipe lengths thereto in different operating positions.
Figure 3:
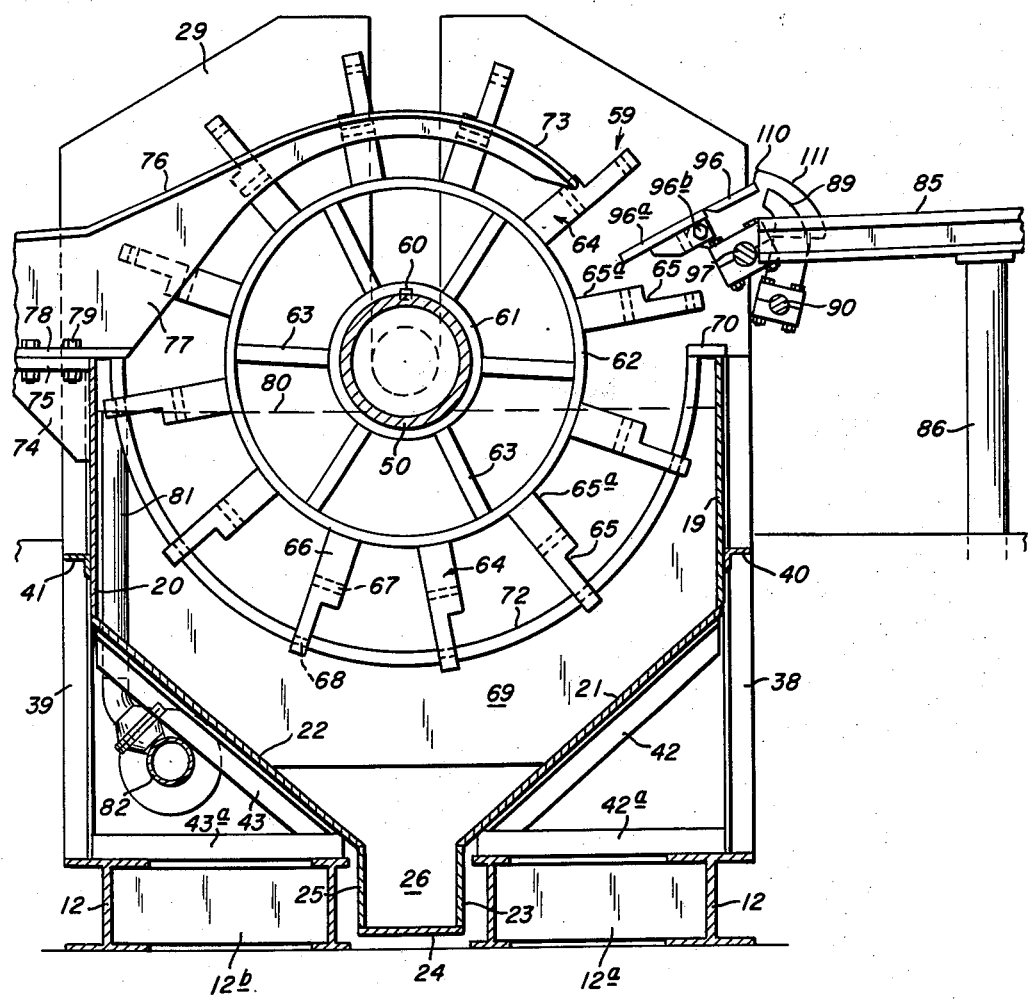
FIGURE 3 is a sectional view taken on the plane of line III—III of FIGURE 1, showing in elevation means for handling pipe lengths in a complete immersing or washing operation.

As shown in FIGURES 1, 1a, 2 and 3 substantially similar tanks 10, 11 are of suitable length to accommodate lengths of pipe and the like, to be immersed and drained.

A tank 10 may contain heated detergent to remove foreign matter from the pipe. A tank 11 may contain heated rinse water or a coating solution. There may be further tanks in series for treating the pipe lengths or the pipe may be discharged for operations thereon by other apparatus.

The tanks are supported in a grid composed of a plurality of spaced, longitudinal beams 12 braced at spaced points by transverse members 12a and 12b. These members are omitted from FIGURES 1 and 1a to avoid unnecessarily complicating the showings thereof. The four corners of a tank are defined and supported by vertical channel members 13, 14, 15, 16, supporting therebetween transverse end plates 17, 18 and longitudinal side plates 19, 20.

The bottoms of the tanks comprise longitudinal inclined plates 21, 22 depending from side plates 19, 20. Plates 23, 24, 25 attached thereto define a longitudinal sump 26, which may be drained by a flanged pipe 27 welded thereto at one end. Adjacent end plates 17, 18 respectively are transverse plates 28, 29 confining the washing or other treating liquid, the spaces therebetween accommodating the apparatus to be described. The tanks are braced or supported at the respective ends by vertical members 30, 31, 32, 33, transverse members 34, 35, 36, 37 and between the ends by spaced vertical members 38, 39, longitudinal members 40, 41 and spaced transverse members 42, 42a, 43, 43a under inclined plates 21, 22.

At the ends of each tank are bearing blocks 44, 45 mounted respectively on plates 44a, 45a for journaling rotatable shafts 46, 47. The shafts are welded to circular plates 48, 49, which in turn are welded into the ends of a shaft 50. Shaft 50 may be a pipe length or a plurality of pipe lengths welded together. Any fluid leakage at shafts 46, 47 is prevented by gaskets 51, 52 held against plates 28, 29 by plates 53, 54. A motor 55 drives shaft 50 through a twin gear box 56, a gear box 57, a coupling 58 and shaft 47. The other half of twin gear box 56 in similar manner drives the corresponding shaft (not shown) in tank 11.

Spider wheels 59 are spaced along and keyed to shaft 50 by keys 60 to handle pipe lengths for immersion and drainage, as will be explained hereinafter. Each wheel comprises a small ring 61 and a larger ring 62 separated and braced by radial bars 63. Equally spaced radial arms 64 are attached circumferentially to ring 62. They are two-stepped arms, that is, they have steps or notches 65 adjacent the outer ends thereof to receive and to hold pipe lengths thereon and inner steps 65a to receive and to hold pipe lengths in cooperation with ring 62. Each arm 64 comprises two notched bars 66 separated by spacers 67, 68.

Supported at spaced points in each tank are arcuate skids 69 which cooperate with radial arms 64 and notches 65 to sweep or to transfer immersed pipe laterally through a tank. Each skid 69 is a vertical, transverse plate attached to the side and bottom plates of the tank and to bars 70, 71 on plates 19, 20. An arcuate edge 72 on each skid has as its radius the axis of shaft 50. This radius should, of course, be proportioned to the inner and outer radii of notches 65 to handle efficiently larger diameter pipe or even a plurality of pipe.

Discharge skids 73 are spaced along and supported on tank plates 20 by vertical brackets 74 supporting transverse plates 75. Each discharge skid 73 comprises a curved skid plate 76, web plate 77 and a flange plate 78 bolted to plate 75 by bolts 79. From the center of the washer, that is, from the axis of shaft 50, the radius from the right or receiving end of the upper surface of skid plates 76 should be sufficiently smaller than the corresponding inner radius of the notches 65 of arms 64 to permit easy transfer of pipe lengths from the notches to the receiving ends of the discharge skids. The notches should be proportioned to retain thereon any size pipe lengths to be handled.

The liquid level 80 in the tanks is maintained by spaced adjustable stand pipes 81 draining into a pipe 82, which has a blind flange 83 at one end and is open at the opposite end to drain to a treating sump (not shown) or to other disposal means. Spaced steam lines 84, connected to a source of steam (not shown) serve to maintain the washing or treating fluid at a preferred temperature.

Pipe lengths to be treated are delivered to tank 10 on inclined, spaced skids 85, supported on posts 86 and brackets 85a attached to tank 10. Discharge skids 73 deliver or feed pipe lengths from tank 10 to tank 11. A pipe guide 87, supported on tank 10 by vertical members 88, lines up the pipe lengths as they roll to tank 10.

A plurality of arcuate pipe stops 89, keyed at spaced points to a shaft or bar 90, serve to stop the pipe lengths. As shown in FIGURE 5, shaft 90 is journaled in spaced pillow blocks 91 supported on tank 10 by brackets 92. To accommodate a range of pipe sizes, necessary reciprocation of stops 89 and shaft 90 is effected by an arm 93, keyed to the end of shaft 90. The other end of arm 93 is raised and lowered by a vertical adjustment screw 94 keyed to and rotated by a hand wheel 95.

At spaced points along tanks 10 and 11, pickoff or kickout arms 96 keyed to a longitudinal shaft 97 journaled in spaced pillow blocks 97a and a bracket 97b on the tanks extend inwardly of notches 65 on radial arms 64 and, on being pivoted, lift pipe lengths from behind pipe stops 89 and feed them to arms 64. Arms 96 have inwardly extending hinged portions 96a thereon that may pivot upwardly on pins 96b. This is a safety feature, should there be a malfunction in the timing of arms 64 and arms 96, relative to each other. Should arms 96 strike a pipe, hinged portions 96a would pivot upwardly, permitting the pipe to slide by without damage to either pipe or arms 96. Thereafter, the hinged portions 96a would pivot by gravity to their normal positions.

A toothed cam wheel 98 is keyed to the outer end of shaft 46. As wheel 98 is rotated counterclockwise, a tooth 99 thereon engages and raises a cam 100 journaled in a cam follower arm 101, keyed to a shaft 102, journaled in bracket 102a. Teeth 103 on the outer end of arm 101 mesh with teeth 104 on a gear segment 105 keyed to shaft 97 and thereby pivot pickoff or kickout arms 96 counterclockwise to a pipe-feeding position. An adjustable, counterweighted arm 106 keyed to shaft 97 pivots the shaft in a clockwise direction, retracting kickout arms 96 and by means of the described linkage returns cam 100 to a position to be engaged by the next tooth 99 on wheel 98. Any tendency for kickout shaft 97 to override in either direction is cushioned by an adjustable, double-acting hydraulic shock absorber 107, pivoted at its lower end on a clevis 108, welded to a tank-supported bracket 109 and at its upper end is pinned to an outer lip on gear segment 105.

In operation, as shown in FIGURES 6, 7, 8, a plurality of pipe lengths P roll down inclined skids 85 and come to rest against the arcuate faces of adjustable pipe stops 89. As explained hereinabove, shaft 50 and spider wheels 59 thereon are rotated counterclockwise, a tooth 99 on toothed wheel 98 raises cam 100 and through meshed gear segments 101 and 105 rotates shaft 97 and kickout arms 96 counterclockwise. As kickout arms 96 rotate, an outer lip 110 thereon is inserted between the first and second pipe lengths resting against the pipe stop 89. The first length is raised, rolls down the kickout arms, is deposited on the inner step 65a of radial arms 64 and rolls by gravity into contact with the outer ring 62 of spider wheels 59. The remaining lengths on skids 85 are held in substantially the same position by the outer arcuate face 111 of kickout 96 as it rotates counterclockwise and when it is retracted by counterweighted arm 106 the next pipe length comes to rest against the pipe stops 89. To feed a larger diameter pipe length or even a plurality of lengths to arms 64, shaft 90 is rotated counterclockwise to accommodate a larger size by adjusting the pipe stops to increase the distance between the face of pipe stop 89 and lip 110 of kickout 96. It is preferred to have an equal number of arms and teeth on the spider wheels and toothed wheel respectively, and to space them circumferentially for proper feed timing of pipe to a washer.

Under the influence of gravity, as wheel 59 continues turning, the pipe length successively rolls between the arms over ring 62, rolls over the back surface 65b of the next preceding arms 64 and into the treating liquid below the surface 80 thereof, rolls downwardly on the arcuate skids 69 and then is swept along by and raised in the outer step or notch 65 of the same arms on which the pipe length was deposited originally. Since the outer, pipe-receiving surface of skid plate 76 on discharge skids 73 has a radius smaller than the corresponding inner radius of notch 65 on arms 64, there will be easy transfer of a pipe length to the discharge skids, over which the length will be rolled, urged first by the notches and thereafter by gravity to another washing tank feed means or to other means for disposing thereof.

From the foregoing description, it will be apparent that the present invention provides an apparatus of simple, rugged construction. The components thereof cooperate to handle pipe lengths automatically for treatment by immersion in a tank and provide an extended period of drainage by permitting the pipe to rotate above the fluid for approximately one-half revolution of the spider wheels before being discharged to the next tank or other processing means. Fluid drainage to a treating tank makes possible the reuse thereof with a minimum amount of makeup addition. This eliminates the frequent use of a pump where means outside the tank must be used to collect fluid drainage. Where, for example, a detergent fluid is hot, this extended drainage period also allows the pipe lengths to dry, thereafter permitting them to be immersed in an adjoining pipe-coating tank. Where required, for example, in treating with a more viscous fluid, both filling and drainage may be speeded by tilting the pipe lengths. This may be effected by adjusting the relative, longitudinal height of the spaced, feeding, treating and discharge components with respect to the tank. Adjustments in the feeding means for different sizes or a plurality of pipe lengths are effected very simply by rotating the pipe stops by means of a hand wheel. The two-step arms on the spider wheels permit feeding of pipe lengths to the inner steps while the outer steps or notches hold treated pipe lengths for drainage.

Although I have disclosed herein the preferred embodiment of my invention, I intend to cover as well any change or modification therein which may be made without departing from the spirit and scope of the invention.

I claim:

1. Apparatus for immersing elongated articles comprising a tank, a shaft journaled longitudinally on said tank, means for rotating said shaft, radial arms extending from said shaft at points spaced therealong, notches formed in the outer extremities of said arms adapted to receive and hold articles delivered to said apparatus for transfer from one side of said shaft to the other side thereof, means on said one side of said apparatus extending between said spaced points and adapted to feed elongated articles longitudinally to said arms inwardly of said notches, whereby, on rotation of said shaft, said articles are carried around said shaft, arcuate skids around the lower portion of said tank on which the articles travel on further rotation, each article being picked up from the bottom of said skids by the notches of said arms and discharge skids extending over said shaft inwardly of said notches.

2. Apparatus as described in claim 1, characterized by said feed means comprising spaced arms pivotally mounted at the side of said tank, means mounted on said shaft adapted to pivot said arms and thereby to feed articles from the pivoted arms to said radial arms.

3. Apparatus as described in claim 1, characterized by a toothed wheel mounted on said shaft, spaced skids leading to said tank, a second shaft journaled longitudinally at the side of said tank, arms mounted thereon and adapted to be engaged by said teeth whereby to feed articles from said skids to said radial arms.

References Cited in the file of this patent

UNITED STATES PATENTS

| | | |
|---|---|---|
| 1,720,525 | Potthoff | July 9, 1929 |
| 2,355,249 | Szaba | Aug. 8, 1944 |